United States Patent
Myszkowski et al.

(10) Patent No.: US 11,299,109 B2
(45) Date of Patent: Apr. 12, 2022

(54) MODULAR SIDE LINING

(71) Applicant: Honda Motor Co., Ltd., Tokyo (JP)

(72) Inventors: Marek Myszkowski, Powell, OH (US); Sean M Gavin, Raymond, OH (US); Sarah J Huth, Dublin, OH (US); Shirena Takai, Dublin, OH (US); Larry G Hughes, Jr., Worthington, OH (US); Ryan W. Van Voorhis, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 137 days.

(21) Appl. No.: 16/819,514

(22) Filed: Mar. 16, 2020

(65) Prior Publication Data

US 2021/0284084 A1   Sep. 16, 2021

(51) Int. Cl.
*B60R 13/02* (2006.01)
*B60R 7/04* (2006.01)
*B60R 11/06* (2006.01)

(52) U.S. Cl.
CPC ............ *B60R 13/0237* (2013.01); *B60R 7/04* (2013.01); *B60R 11/06* (2013.01); *B60R 2013/0287* (2013.01)

(58) Field of Classification Search
CPC ....... B60R 13/0237; B60R 7/04; B60R 11/06; B60R 2013/0287
USPC ...................................... 296/37.8, 37.1, 1.08
See application file for complete search history.

(56) References Cited

U.S. PATENT DOCUMENTS

| | | | | |
|---|---|---|---|---|
| 5,951,085 | A * | 9/1999 | Fukatsu | B60R 7/02 296/37.8 |
| 6,832,799 | B2 * | 12/2004 | Haspel | B60R 7/02 296/37.16 |
| 7,794,004 | B2 * | 9/2010 | Aebker | B60R 5/04 296/37.8 |
| 10,189,371 | B2 | 1/2019 | Takeuchi et al. | |
| 10,245,955 | B2 | 4/2019 | Nakayama | |
| 2009/0001748 | A1 * | 1/2009 | Brown | B60R 7/005 296/37.8 |
| 2010/0052353 | A1 * | 3/2010 | Shea | B60H 1/00592 296/37.16 |

(Continued)

FOREIGN PATENT DOCUMENTS

DE   102013223654 A1   6/2014
DE   102012217180 B4   4/2018

(Continued)

*Primary Examiner* — D Glenn Dayoan
*Assistant Examiner* — E Turner Hicks
(74) *Attorney, Agent, or Firm* — American Honda Motor Co., Inc.; Mark Duell (57) ABSTRACT

A modular side lining forming a portion of an interior surface of a motor vehicle includes a first lining member having a recessed portion, a side portion, and an upper surface portion, a second lining member, and a rear stiffener defining a rear edge of the recessed portion of the first lining member. The second lining member includes one of a plurality of bins configured to be received in the recessed portion of the first lining member and one of a plurality of lids covering a portion of the bin and forming a side surface of the modular side lining with the side portion of the first lining member. The combination of bins and lids may be selected based upon a plurality of different functional configurations.

16 Claims, 9 Drawing Sheets

(56) References Cited

U.S. PATENT DOCUMENTS

2011/0248521 A1*  10/2011  Jackson .................... B60R 5/04
                                                    296/37.1
2018/0141510 A1*  5/2018   Toyoda ................... B60R 16/04
2019/0061508 A1   2/2019   Sawatzki et al.
2019/0084483 A1*  3/2019   Ito ........................ B60R 13/011

FOREIGN PATENT DOCUMENTS

DE    102013202587 B4    6/2019
KR       20110122303 A   11/2011
WO         2011030041 A1  3/2011

* cited by examiner

MODULAR SIDE LINING

TECHNICAL FIELD

The embodiments described herein are related to the field of side linings of the interior of a motor vehicle.

BACKGROUND

In the past, vehicles with different trim packages often included different parts in the same motor vehicle, such as two or more versions of a rear side lining. One may have included a storage pocket in the cargo area, and a second may have included a door to reveal a secure or hidden storage area in the cargo area. These versions had separate base linings because of the different cargo area features, even though the armrest, cup holder, speaker grille, and electrical panel parts are the same between the two. A need exists to make as much of the vehicle parts standard as possible, thus limiting the need and size of exclusive parts for different trim variations of the same motor vehicle.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a modular side lining forming a portion of an interior surface of a motor vehicle includes a first lining member, the first lining member having a recessed portion, a side portion, and an upper surface portion, a second lining member, the second lining member including a bin configured to be received in the recessed portion of the first lining member and a lid covering a portion of the bin and forming a side surface of the modular side lining with the side portion of the first lining member, and a rear stiffener defining a rear edge of the recessed portion of the first lining member.

According to another aspect, a modular side lining forming a portion of an interior surface of a motor vehicle includes a first lining member, the first lining member having a recessed portion, a side portion, and an upper surface portion, a second lining member, the second lining member including a bin configured to be received in the recessed portion of the first lining member and a lid covering a portion of the bin and forming a side surface of the modular side lining with the side portion of the first lining member, a rear stiffener defining a rear edge of the recessed portion of the first lining member, and a component disposed in the recessed portion of the first lining member and covered by the second lining member.

According to yet another aspect, a modular side lining forming a portion of an interior surface of a motor vehicle includes a first lining member, the first lining member having a recessed portion, a side portion, and an upper surface portion, a second lining member including a bin configured to be received in the recessed portion of the first lining member and a lid covering a portion of the bin and forming a side surface of the modular side lining with the side portion of the first lining member, and a rear stiffener defining a rear edge of the recessed portion of the first lining member, wherein the bin is attached to the first lining member and wherein the lid is removably affixed to the side portion of the first lining member and to the rear stiffener.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
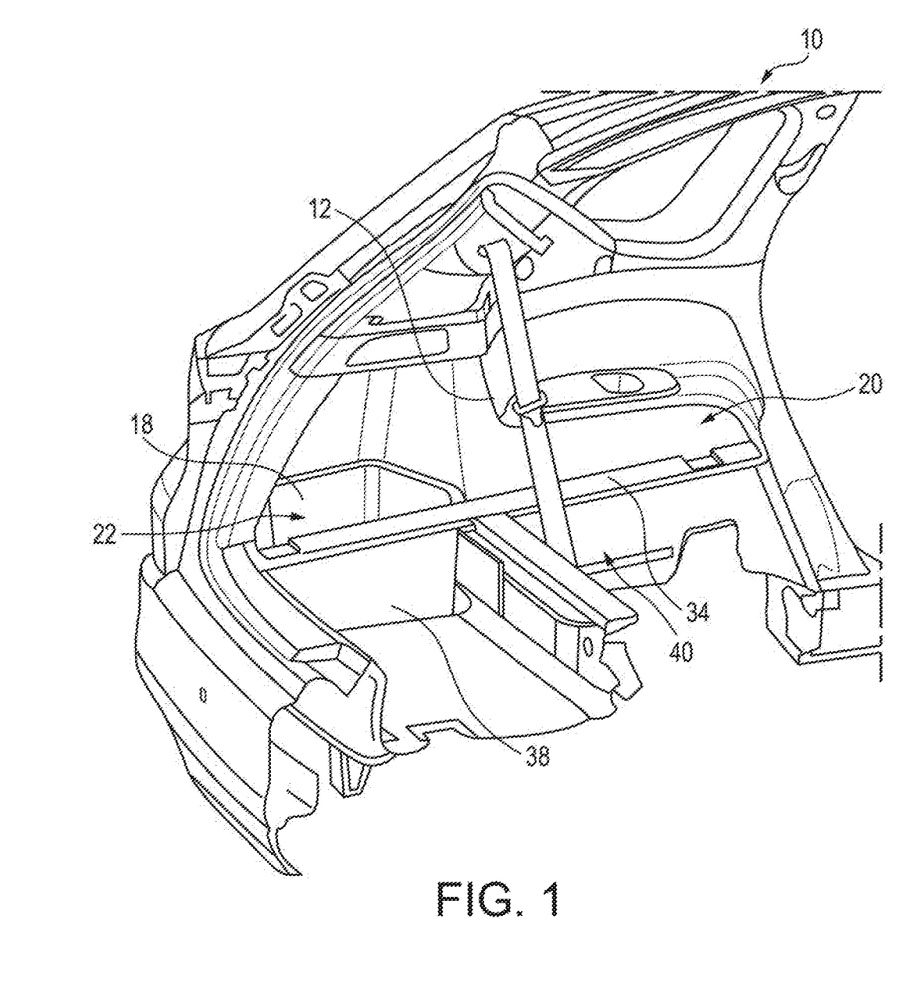
FIG. 1 is a perspective view of a rear portion of a motor vehicle illustrating the location of a modular side lining in the vehicle.
Figure 2:
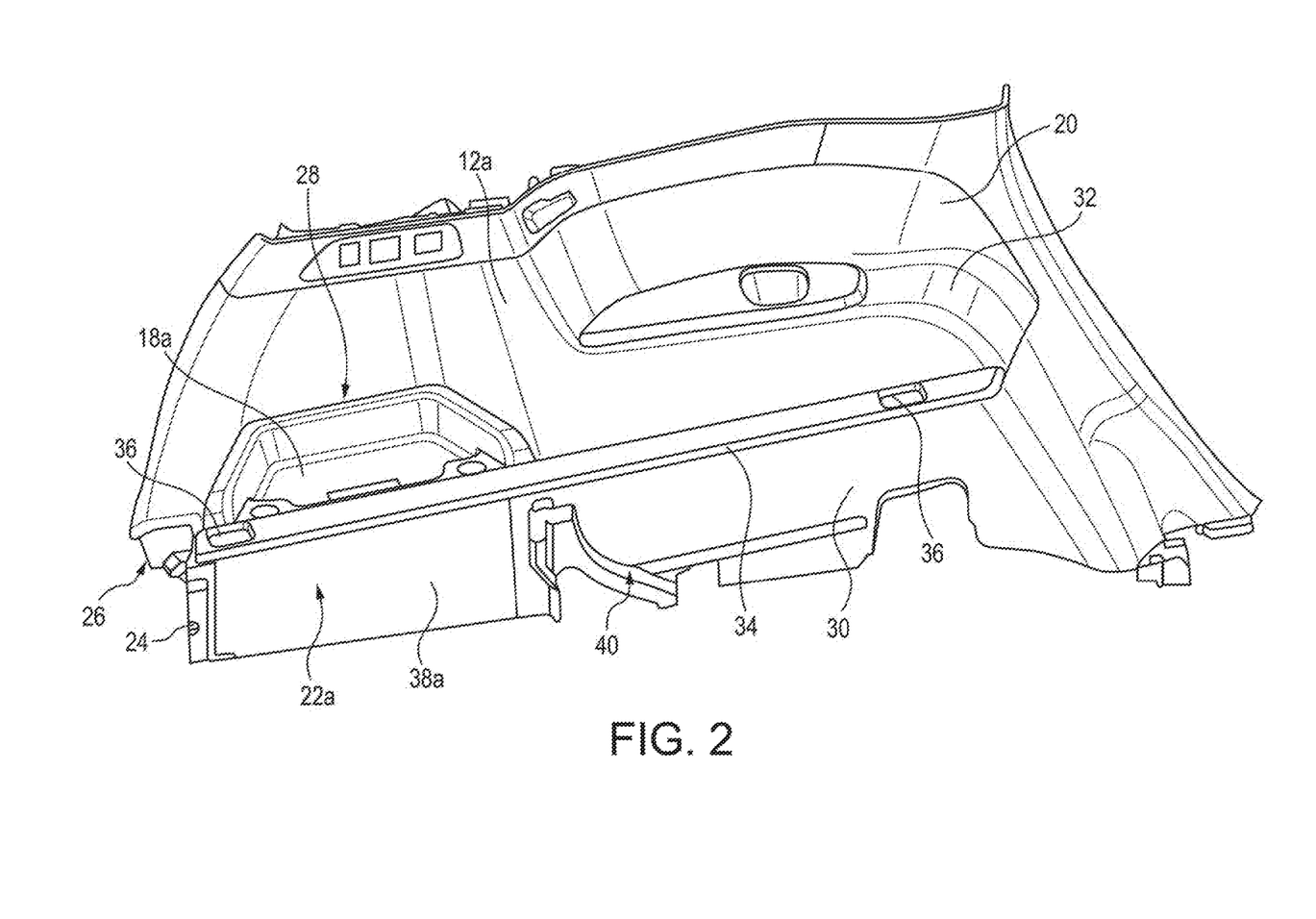
FIG. 2 is a perspective view of a first embodiment of the modular side lining.
Figure 5:
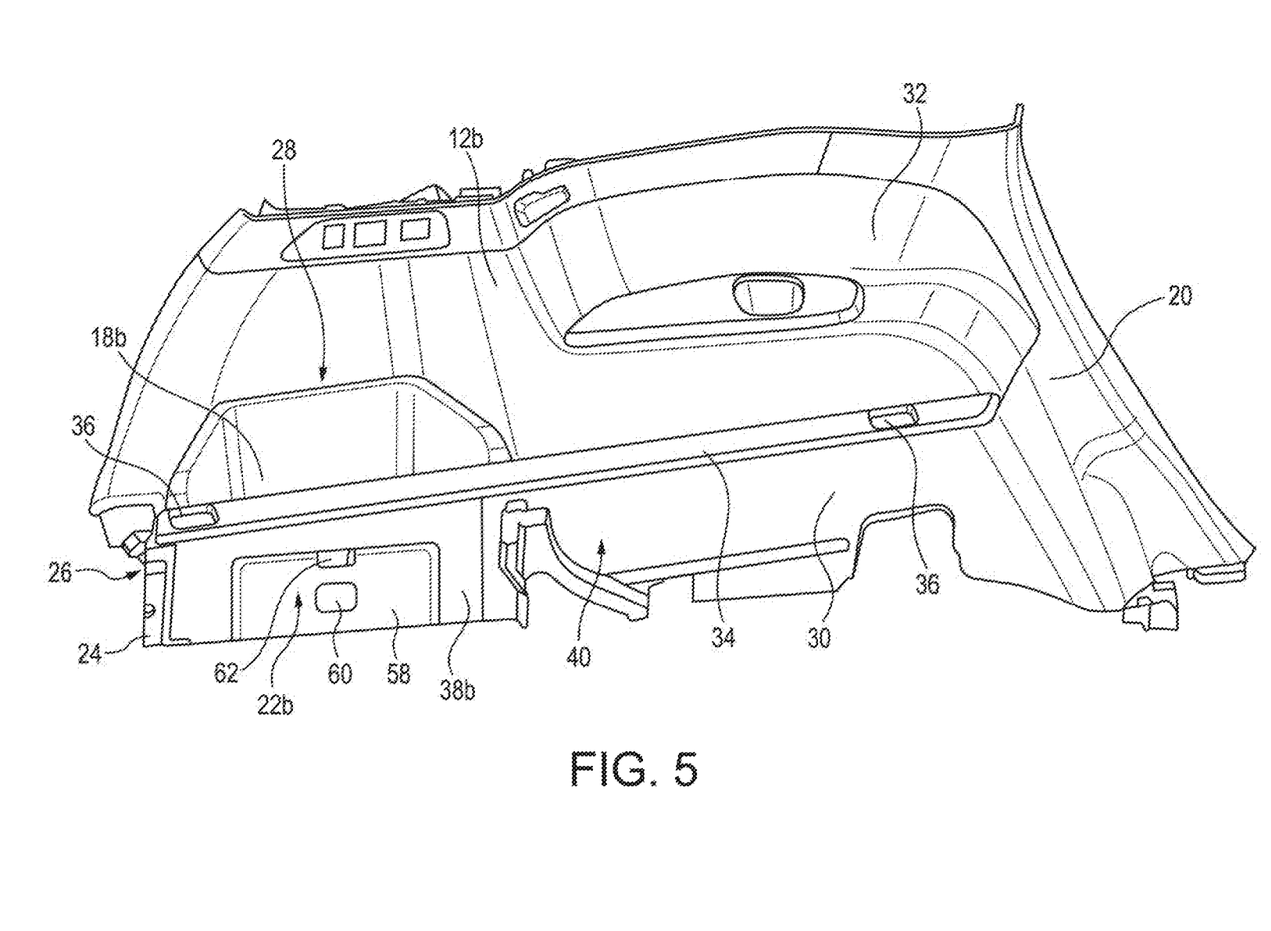
FIG. 5 is a perspective view of a second embodiment of the modular side lining.

With respect to FIG. 1, a modular side lining 12 of a motor vehicle 10 is illustrated. The motor vehicle 10 may be sport utility vehicle, a crossover utility vehicle, a minivan, a hatchback vehicle, or any other type of vehicle with a finished rear interior, often covered by a tailgate. Due to differences in interior packaging, multiple versions of a modular side lining 12*a*, 12*b*, 12*c* may be packaged in the motor vehicle 10, illustrated in FIGS. 2, 5, and 7. The first modular side lining 12*a*, illustrated in FIG. 2, is configured to provide access to a battery compartment 14 located beneath the first modular side lining 12*a*. The second modular side lining 12*b*, illustrated in FIG. 5, is configured to hold a component 16, such as a tire repair kit, located beneath the second modular side lining 12*b*. The third modular side lining 12*c*, illustrated in FIG. 7, includes a large bin 18*c* disposed therein for storage.

Figure 7:
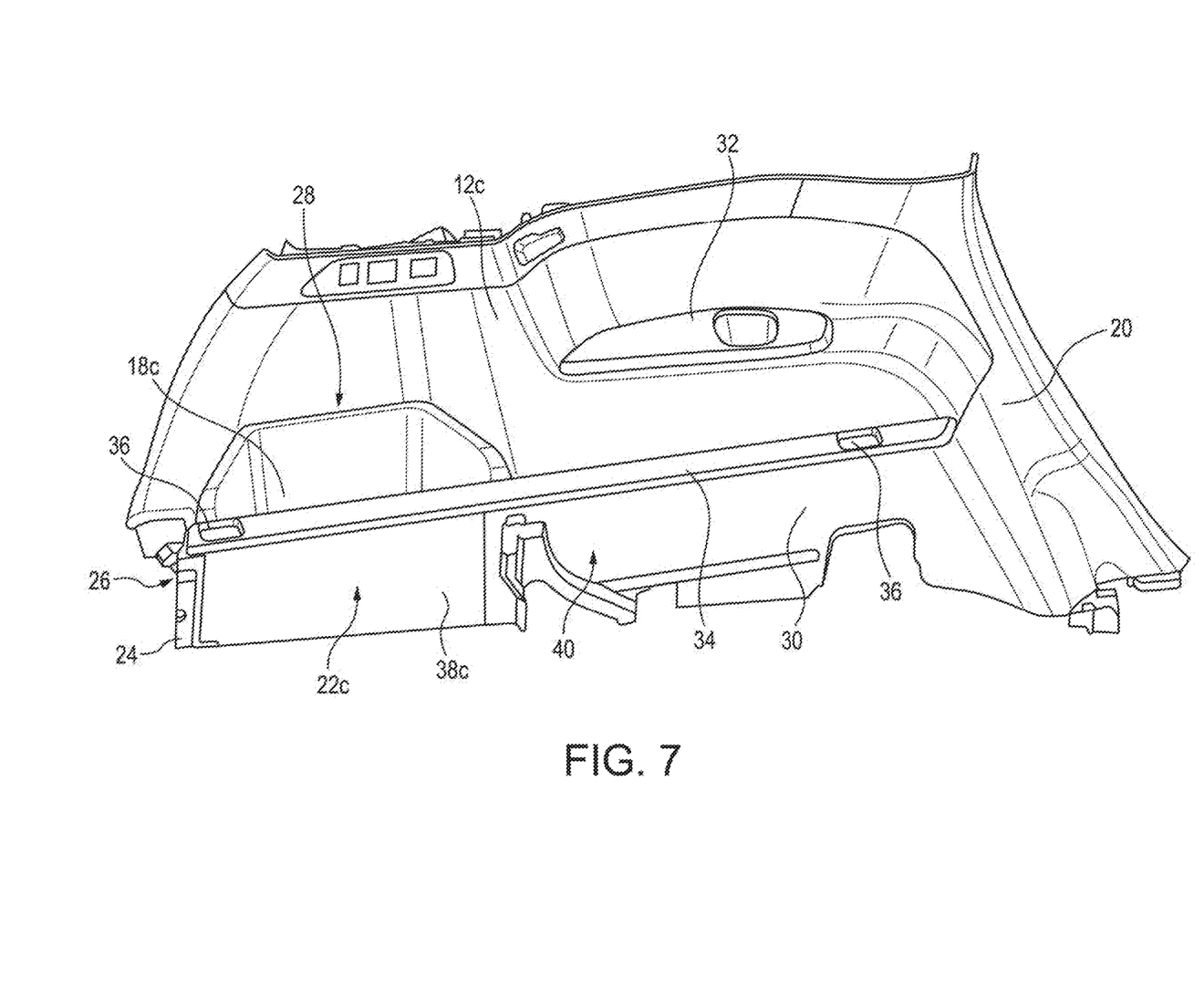
FIG. 7 is a perspective view of a third embodiment of the modular side lining.

In the embodiments illustrated in generally in FIG. 1 and specifically in FIGS. 2, 5, and 7, the modular side lining 12 is separated into two modular parts, a first lining member 20 and a second lining member 22, and a rear stiffener 24 defining a rear edge 26 of the first lining member 20. For all embodiments, the first lining member 20 is constructed of common parts featuring a recessed portion 28, a side portion 30, and an upper surface portion 32. For each of the embodiments, the second lining member 22 may differ, with each embodiment having unique first, second, and third second lining members 22*a*, 22*b*, 22*c*. The first and second lining members 20, 22 also include a strip 34 that may be attached by clips or other suitable fasteners and is removable if service required in the recessed portion 28 requires access by a service technician. The strip 34 defines the edges and joining point of the side portion 30 and upper surface portion 32 of the first lining member 20. Tie-down hooks 36 may be attached and bolted to the side portion 30 and the rear stiffener 24, thereby sandwiching and holding the strip 34 in place.

The second lining member 22, which differs for each embodiment of the modular side lining 12, includes a bin 18 configured to be received in the recessed portion 28 of the first lining member 20 and a lid 38 covering a portion of the bin 18 and forming a side surface 40 of the modular side lining 12 with the side portion 30 of the first lining member 20.

The embodiments described herein are interchangeable during manufacturing or outside of the factory, and dealership associates may easily swap the second lining member 22 of each embodiment at the request of a customer.

Figure 3:
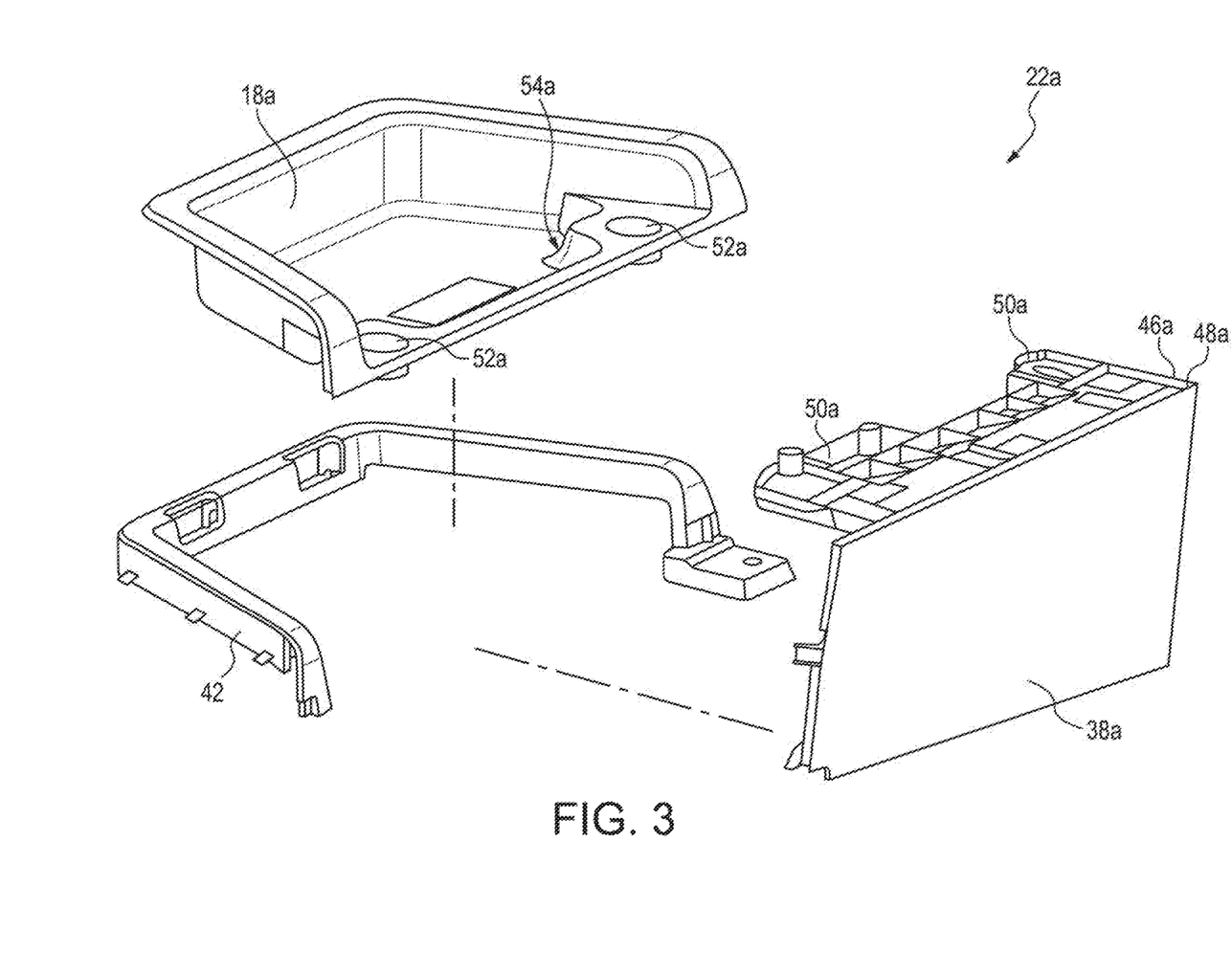
FIG. 3 is an exploded view of a portion of the modular side lining of FIG. 2.
Figure 4:
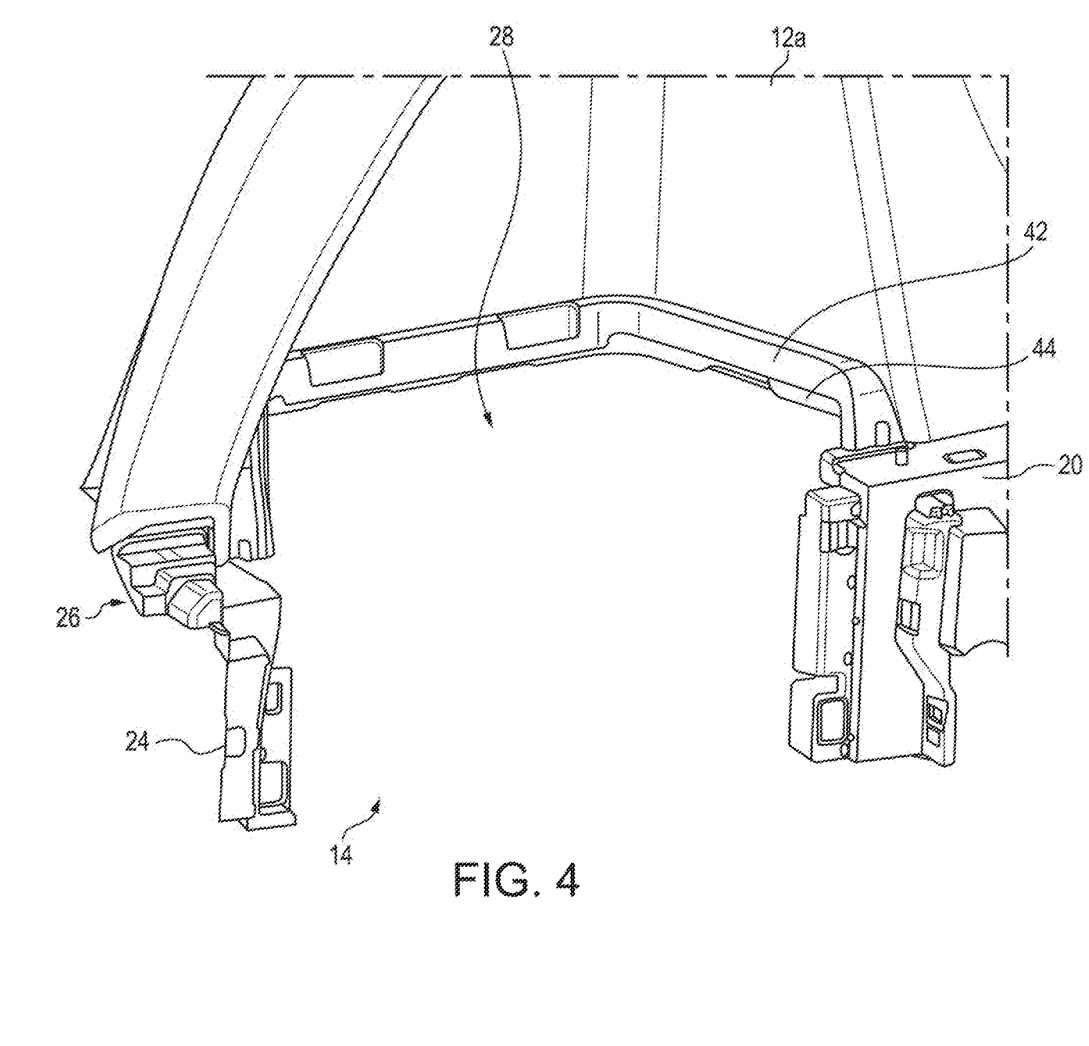
FIG. 4 is a perspective view of another portion of the first embodiment of the modular side lining of FIG. 2.

Each of the embodiments of the modular side lining 12 will now be described in greater detail. First, FIGS. 2-4 illustrate a first modular side lining 12a that is configured to cover a battery compartment 14 in the rear of the motor vehicle 10. The second lining member 22a of the first modular side lining 12a includes a shallow bin 18a, which acts essentially as a top lid of the battery compartment 14 and as a tray for holding small items in the rear of the motor vehicle 10. A support bracket 42 is heat staked to the edge 44 of the recessed area 28 of the first lining member 20. The support bracket 42 is adapted to secure the shallow bin 18a to the recessed portion 28 of the first lining member 20.

The second lining member 22a further includes a lid 38a covering a portion of the shallow bin 18a and forming a side surface 40 of the modular side lining 12a with the side portion 30 of the first lining member 20. The lid 38a covers the recessed area 28 of the first lining member 20 and extends vertically to the strip 34 and longitudinally rearward to the rear stiffener 24. The lid 38a further includes a lip 46a extending inward from the upper edge 48a of the lid 38a having two extensions 50a configured to engage with two lid locks 52a located in an upper surface 54a of the shallow bin 18a securing the lid 38a in place. The extensions 50a may be secured in the lid locks 52a by an interference fit, as shown in the illustrated embodiment, or by any suitable fastener. The lid 38a and the shallow bin 18a, as well as the strip 34, are designed to be removable to provide access to the battery compartment 14 below.

Figure 6:
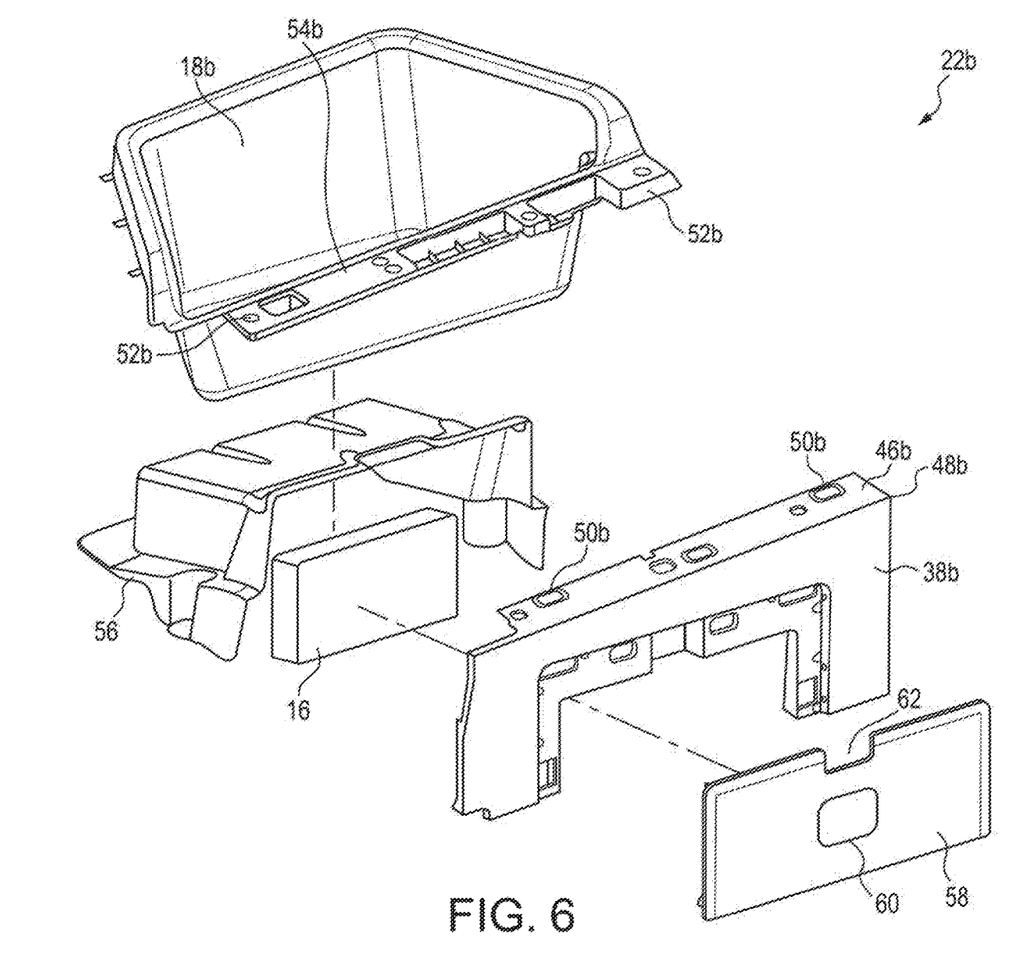
FIG. 6 is an exploded view of a portion of the modular side lining of FIG. 5.

FIGS. 5-6 illustrate a second embodiment of the modular side lining 12b. The second lining member 22b includes a holder 56 for holding a component 16 that is affixed to the first lining member 20 and disposed in the recessed portion 28 of the first lining member 20. The component 16 may be a tire repair kit for repairing a tire or providing the tools to replace a tire of the motor vehicle 10 with a spare tire (not illustrated) stored on board the motor vehicle 10.

The second lining member 22b further includes a bin 18b positioned vertically above the holder 56 in the recessed portion 28 of the first lining member 20 and a lid 38b. The lid 38b includes a removable lid pocket 58 disposed in the lid 38b configured to provide access to the component 16 held by the holder 56. The lid pocket 58 includes a rotatable lock 60 that engages a lock in the lid 38b when in a first position that holds the lid pocket 58 in place. The rotatable lock 60 may be rotated approximately 90° to disengage the lock, thereby allowing the lid pocket 58 to be removed. A notch 62 in the lid pocket 58 allows the user to grip the lid pocket 58 with a finger to remove the lid pocket 58.

In an alternate embodiment, the lid pocket 58 may be held in place by removable clips (not illustrated) that create an interference fit.

As with the first embodiment, the second embodiment of the modular side lining 12b is configured such that the second lining member 22b further includes lid lock 52b extending outward from an upper surface 54b of the bin 18b. A lip 46b extends inward from the upper edge 48b of the lid 38b includes and extensions 50b configured to engage with the lid lock 52b of the bin 18b and the strip 34. The extensions 50b may be secured in the lid locks 52b by an interference fit, as shown in the illustrated embodiment, or by any suitable fastener. The lid 38b and the bin 18b, as well as the strip 34, are designed to be removable to provide access to the holder 56 and component 16.

Figure 8:
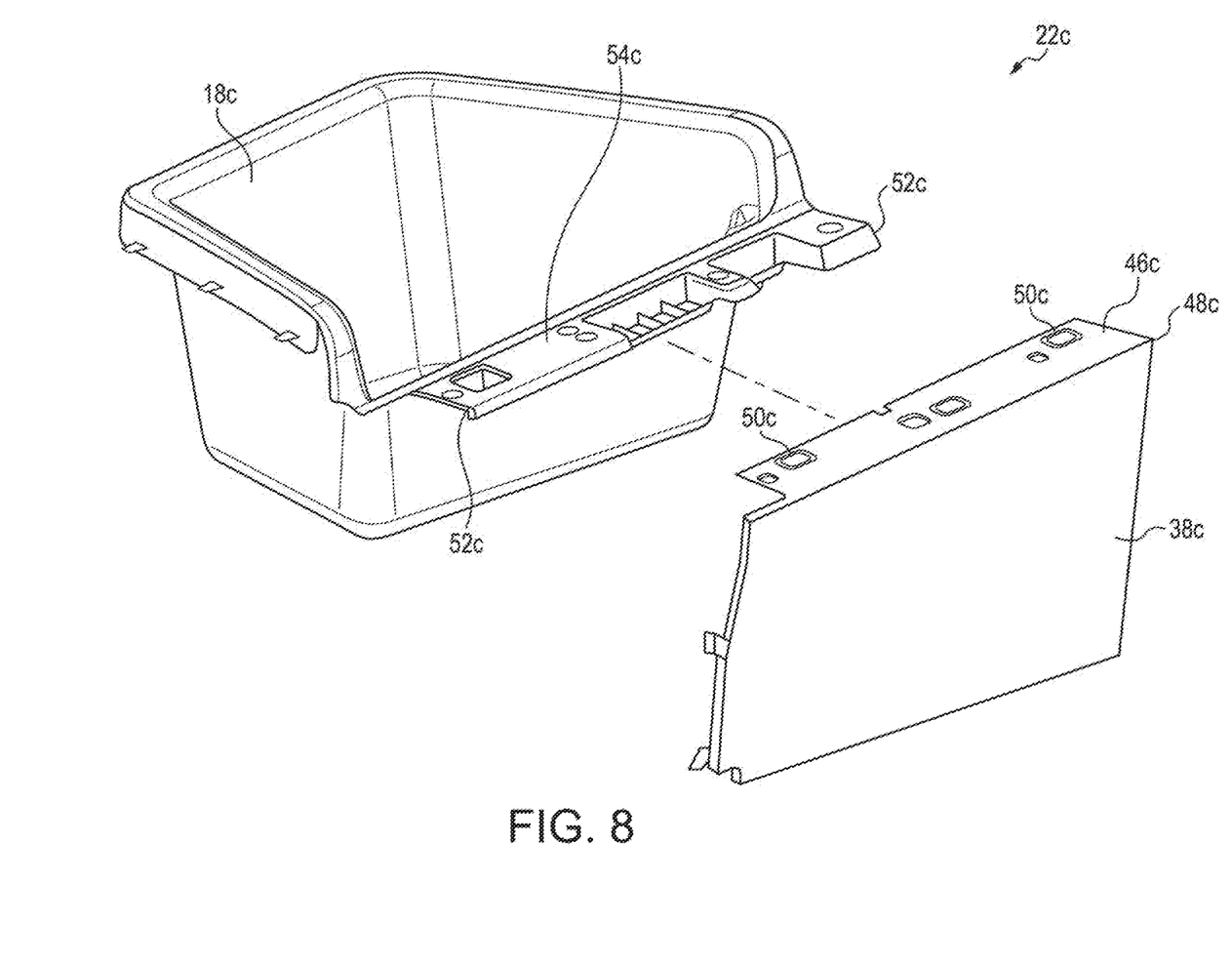
FIG. 8 is an exploded view of a portion of the modular side lining of FIG. 7.
Figure 9:
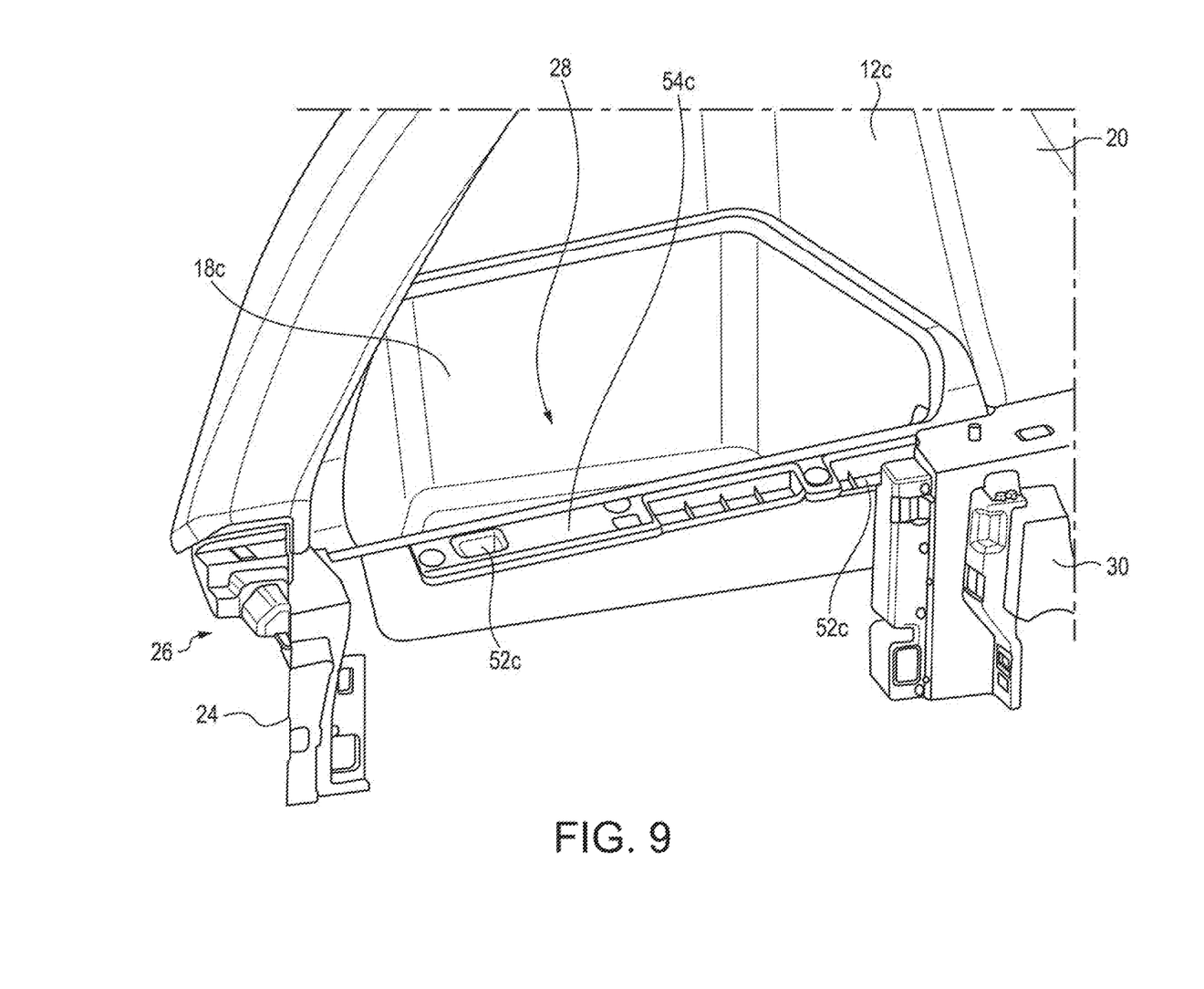
FIG. 9 is a perspective view of another portion of the first embodiment of the modular side lining of FIG. 7.

FIG. 7-9 illustrate the third embodiment of the modular side lining 12c in which a large bin 18c is permanently attached to the first lining member 20 and disposed in the recessed area 28. The modular side lining 12c further includes a lid 38c removably affixed to the side portion 30 of the first lining member 20 and to the rear stiffener 24.

The modular side lining 12c is configured such that the second lining member 22c further includes lid locks 52c extending outward from an upper surface 54c of the bin 18c. A lip 46c extends inward from the upper edge 48c of the lid 38c includes extensions 50c configured to engage with the lid locks 52c of the bin 18c and the strip 34. The extensions 50c may be secured in the lid locks 52c by an interference fit, as shown in the illustrated embodiment, or by any suitable fastener. The lid 38c and the strip 34, are designed to be removable to provide access to the recessed area 28 located beneath the bin 18c as illustrated in FIG. 9.

In an alternate embodiment, the bin 18c may further be configured to be removable for cleaning, service, and the like.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A modular side lining forming a portion of an interior surface of a motor vehicle, comprising:
   a first lining member, the first lining member having a recessed portion, a side portion, and an upper surface portion;
   a second lining member, the second lining member comprising:
      a bin configured to be received in the recessed portion of the first lining member; and
      a lid covering a portion of the bin and forming a side surface of the modular side lining with the side portion of the first lining member;
   a rear stiffener defining a rear edge of the recessed portion of the first lining member; and a removable strip attached to the first lining member and the rear stiffener, the removable strip covering a line defining a border between the side portion and the upper surface portion of the first lining member and further covering an upper edge of the lid.

2. The modular side lining of claim 1 further comprising:
a battery storage compartment disposed beneath the bin.

3. The modular side lining of claim 2 further comprising:
a support bracket adapted to secure the bin to the recessed portion of the first lining member.

4. The modular side lining of claim 3 wherein the second lining member further comprises:
a lid lock located in an upper surface of the bin; and
a lip extending inward from the upper edge of the lid, the lip comprising an extension configured to engage with the lid lock of the bin.

5. The modular side lining of claim 1 further comprising:
a holder for holding a component, the holder being affixed to the first lining member and disposed in the recess portion of the first lining member.

6. The modular side lining of claim 5 wherein the lid further comprises:
a removable lid pocket disposed in the lid, the removable lid pocket configured to provide access to the component held by the holder.

7. The modular side lining of claim 6 wherein the second lining member further comprises:
a lid lock extending outward from an upper surface of the bin; and
a lip extending inward from the upper edge of the lid, the lip comprising an extension configured to engage with the lid lock of the bin.

8. The modular side lining of claim 7 wherein the component comprises:
a tire repair kit.

9. The modular side lining of claim 1 wherein the bin is permanently attached to the first lining member.

10. The modular side lining of claim 9 wherein the lid is removably affixed to the side portion of the first lining member and to the rear stiffener.

11. The modular side lining of claim 1 wherein the removable strip further comprises:
a tie down hook; and
a fastener for attaching the tie down hook to the removable strip.

12. A modular side lining forming a portion of an interior surface of a motor vehicle, comprising:
a first lining member, the first lining member having a recessed portion, a side portion, and an upper surface portion;
a second lining member, the second lining member comprising:
a bin configured to be received in the recessed portion of the first lining member; and
a lid covering a portion of the bin and forming a side surface of the modular side lining with the side portion of the first lining member;
a rear stiffener defining a rear edge of the recessed portion of the first lining member;
a component disposed in the recessed portion of the first lining member and covered by the second lining member;
a holder for holding the component, the holder being affixed to the first lining member and disposed in the recess portion of the first lining member; and
wherein the lid further comprises a removable lid pocket disposed in the lid, the removable lid pocket configured to provide access to the component held by the holder.

13. The modular side lining of claim 12 wherein the second lining member further comprises:
a lid lock extending outward from an upper surface of the bin; and
a lip extending inward from the upper edge of the lid, the lip comprising an extension configured to engage with the lid lock of the bin.

14. The modular side lining of claim 13 wherein the component comprises a tire repair kit.

15. A modular side lining forming a portion of an interior surface of a motor vehicle, comprising:
a first lining member, the first lining member having a recessed portion, a side portion, and an upper surface portion;
a second lining member, the second lining member comprising:
a bin configured to be received in the recessed portion of the first lining member; and
a lid covering a portion of the bin and forming a side surface of the modular side lining with the side portion of the first lining member;
a rear stiffener defining a rear edge of the recessed portion of the first lining member:
a component disposed in the recessed portion of the first lining member and covered by the second lining member; and
a battery located in a storage compartment disposed beneath the bin.

16. The modular side lining of claim 15 further comprising:
a support bracket adapted to secure the bin to the recessed portion of the first lining member;
a lid lock located in an upper surface of the bin; and
a lip extending inward from the upper edge of the lid, the lip comprising an extension configured to engage with the lid lock of the bin.

* * * * *